United States Patent [19]

Johnson

[11] Patent Number: 4,501,160
[45] Date of Patent: Feb. 26, 1985

[54] FORCE TRANSDUCER

[76] Inventor: Michael K. Johnson, 2915 Cherokee Ave., Santa Rosa, Calif. 95401

[21] Appl. No.: 481,076

[22] Filed: Mar. 31, 1983

[51] Int. Cl.³ .............................................. G01L 1/22
[52] U.S. Cl. .................................................. 73/862.65
[58] Field of Search ............ 73/862.65, 862.66, 862.67, 73/1 B; 177/211, 229

[56] References Cited

U.S. PATENT DOCUMENTS

| | | | |
|---|---|---|---|
| 3,788,411 | 1/1974 | Oxley | 177/211 |
| 3,805,600 | 4/1974 | Powell et al. | 177/211 X |
| 3,837,416 | 9/1974 | Nozaki | 73/862.65 X |
| 3,938,603 | 2/1976 | Shoberg et al. | 177/211 |
| 3,994,161 | 11/1976 | Trozera | 73/141 A |
| 4,128,001 | 12/1978 | Marks | 73/1 B |
| 4,181,011 | 1/1980 | Brendel | 73/141 A |

Primary Examiner—Jerry W. Myracle

Attorney, Agent, or Firm—Phillips, Moore, Lempio & Finley

[57] ABSTRACT

A transducer adapted for load cell applications comprises a base having a load receiving member connected thereto by at least one and preferably two flexure springs to permit the member to flex relative to the base. A sensing beam, having one or more strain gauges secured thereon, is mounted in cantilevered relationship on the base and has a free end positioned adjacent to the member for engagement therewith to sense the load imposed on the member to produce a variable electrical output signal in response to the magnitude of the load. An adjustment is preferably provided to selectively adjust a point whereat a sensing tip mounted on the member engages the sensing beam whereby the output signal can be selectively adjusted to vary the weight capacity of the transducer.

27 Claims, 6 Drawing Figures

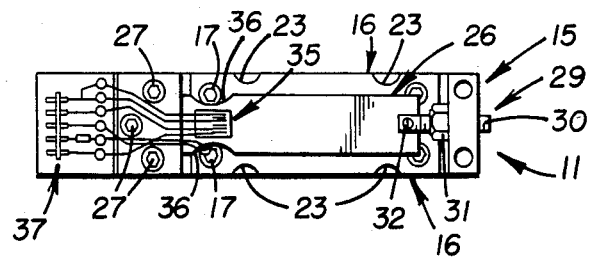
FIGURE 2
FIGURE 1
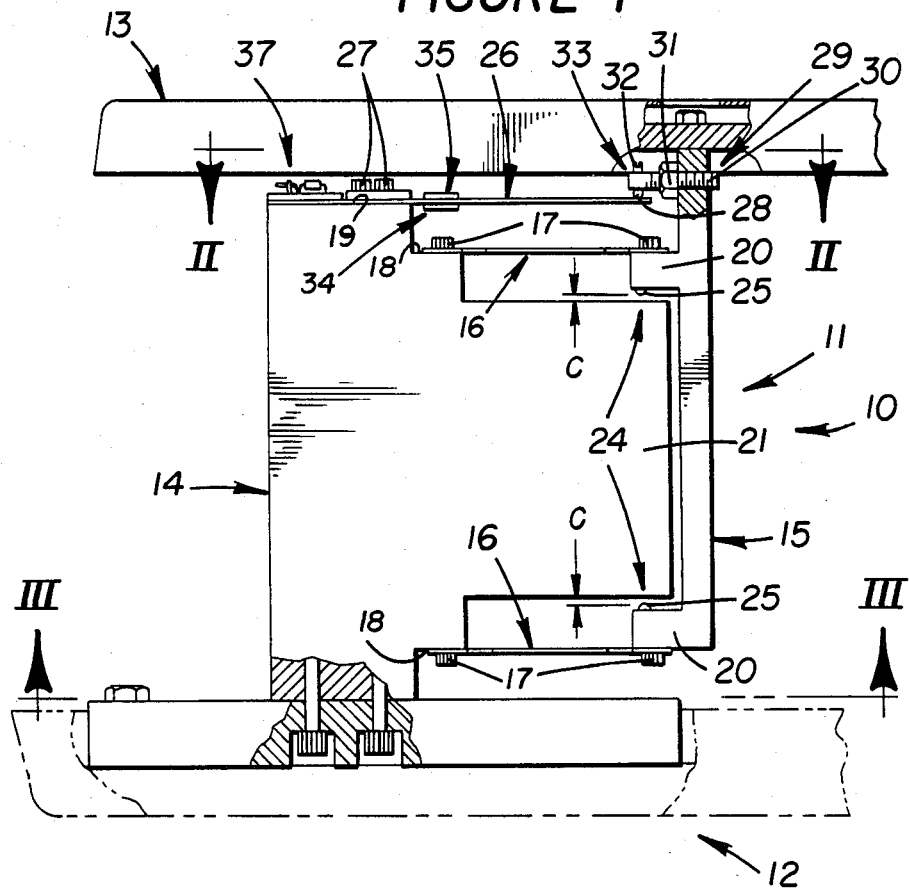
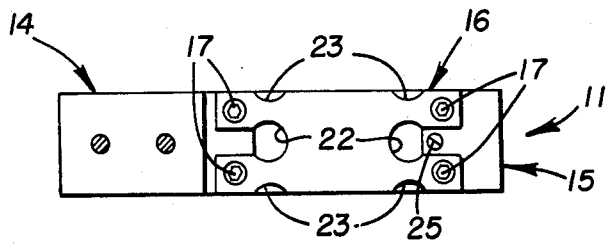
FIGURE 3

FORCE TRANSDUCER

DESCRIPTION

1. Technical Field

This invention relates to a transducer and more particularly to a transducer of the load-cell type adapted for use in weighing apparatus and the like.

2. Background Art

Conventional load cells of the parallel beam type normally comprise a single block of aluminum or other suitable metal that is machined to provide a pair of outer flexures and an intermediate sensing beam secured within the block and having one or more strain gauges secured thereon. One end of the load cell is fixedly secured to a base of a scale or other weighing apparatus, whereas a weighing platter is mounted on the other end of the load cell to impose variable loads thereon. Imposition of a load on the load cell in this manner will bend the sensing beam which, in turn, stresses the strain gauges to produce a variable electrical signal proportional to such load. The strain gauges are normally connected into a Wheatstone bridge type circuit for measuring the signal as a voltage change responsive to a change in resistance of the strain gauges whereby the load can be displayed on a standard readout device.

Load cells of this type are difficult to manufacture, primarily due to the close tolerances that must be held during machining thereof. For example, for a particular load cell application, the flexures must be precisely machined at the end areas whereat they are joined to the main body of the load cell. Machining in excess of the prescribed tolerances will normally result in the scrapping of a particular load cell. Likewise, the sensing beam must be precisely machined to provide the specified bending moment therefor.

In addition, conventional load cells of this type are highly sensitive to torsional loads imposed thereon. For example, when a load to be weighed is mounted on the weighing platter in off-center relationship thereon, torsional loads will be imposed on the sensing beam to adversely affect an accurate readout. This latter problem has been overcome to some extent by the type of load cell disclosed in U.S. Pat. No. 3,994,161 wherein the sensing beam is cantilevered and has a pin secured on an end thereof to engage a pin secured on a load bearing portion of the load cell. However, this pin-on-pin arrangement has drawbacks, such as the inability to effectively cancel-out the effects of off-center loading due to the relative rocking movement between the pins.

Further failings of conventional load cells of the above type include their inability to adjust and compensate for the "dead load" factor, e.g., the weight of the platter. In addition, no provision is made for selectively adjusting the load cell to change the bending moment of the sensing beam whereby the output or weight capacity of the load cell can be selectively increased or decreased. Also, no provision is made for an overload condition of operation, which could overstress the sensing beam and/or flexures beyond their elastic limits, requiring scrapping of the overstressed load cell.

DISCLOSURE OF INVENTION

An object of this invention is to provide an improved transducer, particularly adapted for load cell applications in scales and the like, which overcomes the above, briefly-described prior art problems. The transducer comprises a base having a load receiving member mounted thereon by flexure means to substantially isolate flexing movements of the member relative to the base, a sensing tip on the member, and sensing means, preferably comprising a flat spring, mounted in cantilevered relationship on the base for engaging the sensing tip to sense the load imposed on the member and for producing a variable electrical output signal in response to the magnitude of the load.

In the preferred embodiment of this invention, an adjustment means is provided for selectively adjusting a point whereat the sensing tip engages the sensing means whereby the output signal and thus the capacity of the transducer can be selectively adjusted. The transducer also preferably comprises a "dead load" adjusting means for compensating the system for the weight of a weighing platter and the like, and overload adjustment means for ensuring that the transducer will not be damaged even though it is inadvertently overloaded.

BRIEF DESCRIPTION OF THE DRAWINGS

Other objects and advantages of this invention will become apparent from the following description and accompanying drawing wherein:

FIG. 1 illustrates a weighing apparatus or scale employing a first transducer embodiment of this invention therein;

FIG. 2 is a top plan view of the transducer, taken generally in the direction of arrows 2—2 of FIG. 1;

FIG. 3 is a bottom plan view of the transducer, taken generally in the direction of arrows 3—3 in FIG. 1.

BEST MODE OF CARRYING OUT THE INVENTION

Figures 4, 5, 6:
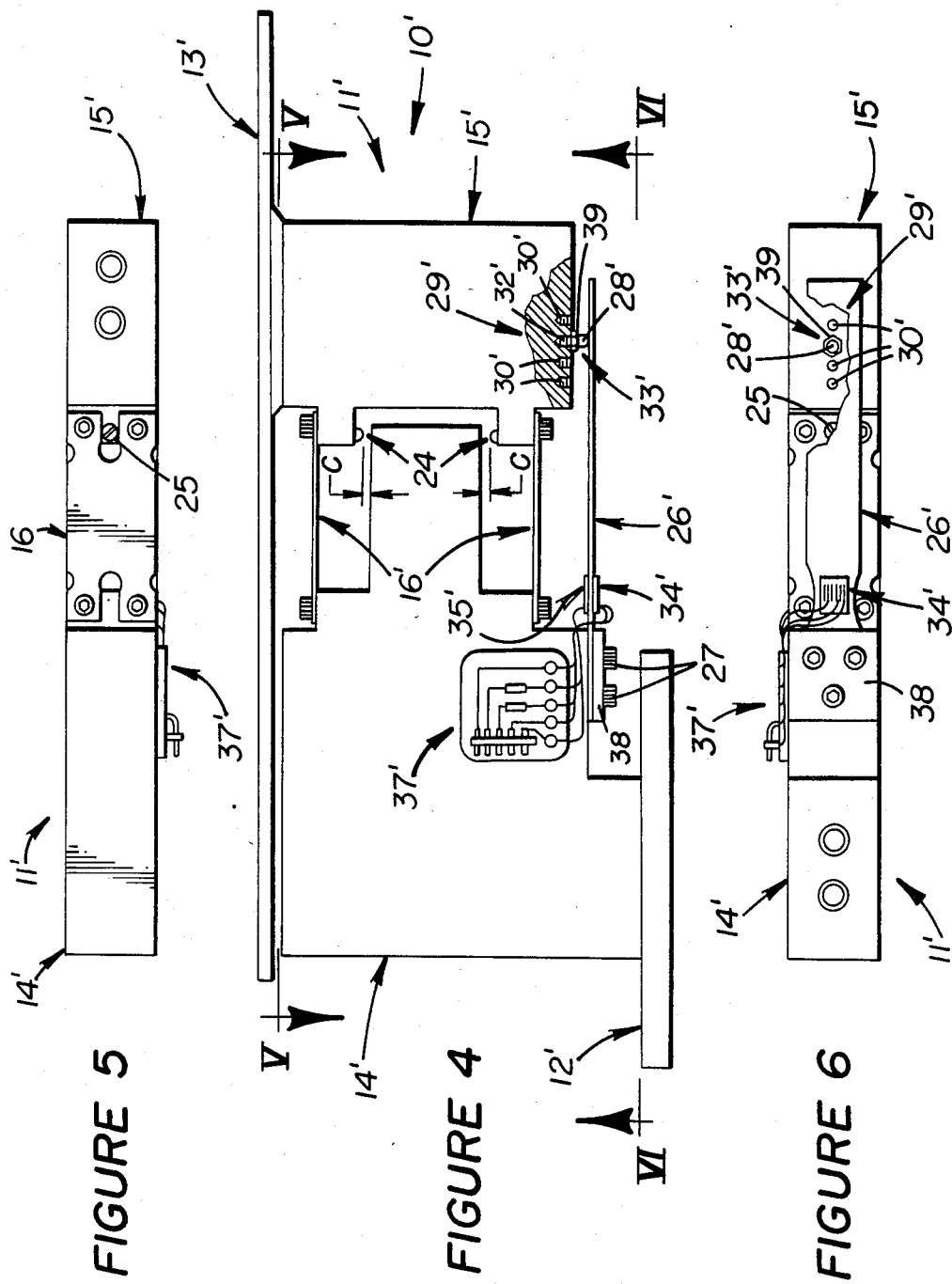
FIGS. 4–6 are figures similar to FIGS. 1-3, but illustrating a second transducer embodiment.

FIG. 1 illustrates a weighing apparatus or scale 10 comprising a transducer 11 mounted in upstanding relationship between a stationary base 12 and a weighing platter 13 to function as a load cell therebetween. Although the transducer 11 is shown for use in a scale application, it should be understood that the transducer can be utilized in other load cell and related applications wherein loads imposed thereon are closely monitored.

Transducer 11 comprises a frame structure, including a rigid base 14 suitably secured to base 12 and a load receiving member 15 shown in the form of a "floating" side mount. A pair of vertically spaced and parallel upper and lower flexures 16 are connected between base 14 and member 15 by screws 17 to provide a parallelogram arrangement, permitting independent flexing movements of the member relative to the base. Although two flexures are illustrated, in certain applications a single flexure (preferably the upper one in FIG. 1) could be utilized.

In the transducer embodiment illustrated, each flexure 16 is in the form of a flat leaf spring having a length approximating 1.6 in., a width approximating 0.75 in., and a thickness approximating 0.01 in. The springs are preferably each composed of beryllium copper (98 percent copper and 2 percent beryllium) suitably mill-hardened or heat-treated to exhibit the desired physical properties for supporting and permitting flexing of member 15 during transducer operation. For example, the spring may have a Rockwell Hardness in the range of C-35 to 42 and exhibit tensile properties as follows: an ultimate strength of from 160,000 to 200,000 pounds per square inch, an elastic limit of from 100,000 to 150,000 pounds per square inch, and a modulus of elasticity of from 16 to 18 million psi, subject to the specific heat treatment of the spring. Base 14 and member 15 may be composed of a suitable plastic or metallic (e.g., aluminum) material.

It should be further noted in FIG. 1 that a first end of each flexure or spring 16 is attached by a screw 17 to a shoulder 18, formed on base 14 and disposed inwardly from an upper surface 19 thereof. A second end of each spring is connected to an outer side of an extension 20 of member 15 by a pair of screws and base 14 has a reduced body portion 21 disposed between extensions 20. As shown in FIGS. 2 and 3, each spring may have notches 22, 23 formed therethrough to precisely calibrate the flexure and related physical characteristics of the spring.

An overload adjustment means 24 is preferably mounted on each extension 20 (or, alternatively, on body portion 21) to delimit flexing movements of member 15 relative to base 14. In the embodiment illustrated, each overload adjustment means comprises a set screw 25 threadably mounted in the underside of each extension 20 with the tips of the set screws illustrated in FIG. 1 provding clearances "c" between the extensions and body portion 21 of the base. The overload adjustment means will prevent undue loading of the transducer, including the overstressing of flexures 16, in both the vertically upward and downward directions of movement of member 15 relative to base 14.

Transducer 11 further comprises a sensing beam 26 positioned on an outer side of upper spring 16 and shown in the form of a flat cantilever spring composed of the same material composing springs or flexures 16 (e.g., beryllium copper). A first end of sensing beam 26 is releasably connected on upper surface 19 and the upper side of base 14 by screws 27, whereas a second, free end thereof extends outwardly into overlying relationship relative to upper extension 20 of member 15. In the embodiment illustrated, the cantilevered end portion of the sensing beam has a length approximating 1.3 in. and a width approximating 0.6 in. As described more fully hereinafter, the free end of the sensing beam is positioned adjacent to member 15 to be deflected thereby in response to the imposition of a load imposed on the member, via a weight placed on platter 13 and a sensing tip 28 that directly engages and bends the sensing beam in response to such weight.

An output adjustment means 29 is mounted on member 15 to selectively decrease or increase the output or weight capacity of the transducer. In particular, the output adjustment means may comprise a set screw 30 adjustably mounted on member 15 to selectively locate the point whereat sensing tip 28 engages sensing beam 26 along its longitudinal axis to vary the bending moment of the beam. A lock nut 31 is threadably mounted on an inboard end of set screw 30, as shown, to lock the set screw in its adjusted position. It should be noted that each axial increment of adjustment of set screw 30 requires one complete rotation (360°) of the set screw to position the longitudinal axis of sensing tip 28 perpendicular relative to the upper flat surface of sensing beam 26.

Sensing tip 28 is preferably spherically or conically shaped to essentially provide a point contact with sensing beam 26. Thus, engagement of the sensing tip with the flat upper surface of the sensing beam will ensure a correct read-out even though an off-center load is applied to platter 13, inducing a slight lateral rocking movement of the sensing tip. The sensing tip may be formed on the end of a set screw 32, threadably mounted on the inboard end of set screw 30. Set screw 32 thus further provides a dead load adjustment means 33 adapted to calibrate-out preloading of the sensing beam, e.g., compensating for the dead weight of platter 13 by suitable adjustment of set screw 32 to position sensing beam 26 in its minimal contact position against sensing tip 28 and to allow flexures 16 to solely absorb such weight.

As shown in FIGS. 1 and 2, a pair of strain gauges 34, 35 are suitably secured on either side of sensing beam 26 for producing a variable electrical output signal (voltage change) in response to the magnitude of the load imposed on platter 13, as reflected by the magnitude of flexure imposed on the sensing beam by sensing tip 28 and the resultant change in resistance in the strain gauges. As is well known to those skilled in the arts relating hereto, the strain gauges can be suitably connected into a Wheatstone Bridge circuit whereby an output voltage and voltage change can be read on appropriate instrumentation in terms of a weight measurement. It should be noted that notches 36 are preferably formed on either side of the sensing beam whereat strain gauge 35 is secured to induce bending thereat and to tailor the sensing beam precisely for a particular load cell application. An array of terminals 37 for strain gauges 34, 35 are suitably mounted rearwardly on surface 19 of base 14 for modular connection to the resistance measuring and weight read-out devices employed with the transducer.

From the above description, it can be understood that the "floating" manner by which load receiving member 15 is mounted on stationary base 14 by flexures 16 and the point contact made by sensing tip 28 on sensing beam 26 during operation of the transducer will substantially eliminate any adverse torsional loads that might be otherwise imposed on the sensing beam. Offset loads imposed on platter 13 will not adversely affect a correct read-out of the loads since even slight rocking movement of sensing tip 28 will still ensure that the load will be imposed perpendicularly on sensing beam 26. Output adjustment means 29 substantially increases the application of the transducer since it can be expeditiously adapted and calibrated for a wide variety of load cell applications having different weight capacities.

Likewise, dead load adjustment means 33 can adapt the transducer for use in various systems wherein compensation must be made for varied preloading of the transducer, e.g., platters 13 having various weights. Overload adjustment means 24 ensure that component parts of the transducer, including flexures 16 and sensing beam 26, will not become overstressed and subjected to damage. In this respect, should component parts of the transducer, such as the flexures and/or the sensing beam, become damaged or worn, they can be replaced expeditiously in contrast to conventional transducers formed out of a single metallic block which must be scrapped entirely. The simplicity in design of the component parts of the transducer renders it highly economical, highly serviceable, and highly durable for long service life expectations.

FIG. 4 illustrates a modified weighing apparatus or scale 10' employing a second transducer embodiment 11' of this invention therein. Corresponding components and constructions are depicted by identical numerals, but with numerals depicting modified components in FIGS. 4-6 being accompanied by a prime symbol (').

The transducer is mounted between a stationary base 12' and a weighing platter 13' to function as a load cell therebetween in the general manner described above. The transducer comprises a frame structure including a rigid base 14', secured to base 12', and a load receiving member 15', connected to base 14' by a pair of vertically spaced flexures 16 in the manner described above. As also described above, a pair of overload adjustment means 24, each comprising a set screw 25, function to prevent undue overloading of the transducer.

Transducer 11' essentially differs from transducer 11 in that a sensing beam 26' is repositioned and secured to a lower side of base 14' by a clamping plate 38 and screws 27. The free end of the sensing beam extends into underlying relationship relative to a bottom side of member 15' and is adapted to be deflected thereby in response to the imposition of a load on platter 13', via a sensing tip 28' that engages and bends the sensing beam in response to such load. Again, the sensing tip is preferably spherically or conically shaped to essentially provide a point contact with the engaged flat surface of sensing beam 26' whereby correct read-outs will be ensured even through an off-center load is imposed on the system.

A modified output adjustment means 29', functioning to selectively decrease or increase the output or weight capacity of the transducer, comprises a plurality of longitudinally aligned and spaced threaded apertures 30 30'. Each aperture is adapted to have a set screw 32' threadably mounted and locked therein by a lock nut 39. Sensing tip 28' is formed on the end of the set screw and can thus be adjustably positioned along the longitudinal axis of the sensing beam to provide the desired output thereof, i.e., to selectively change the effective moment arm of the sensing beam.

Set screw 32' further provides a dead load adjustment means 33', adapted to calibrate-out preloading of the sensing beam, by its inherent ability to be threadably adjusted axially and perpendicular relative to sensing beam 26'. For example, the dead weight of platter 13' may be compensated for in the system by suitable adjustment of the set screw to position sensing beam 26' at its minimal contact position against sensing tip 28' and to allow flexures 16 to solely absorb such weight.

Strain gauges 34, 35, secured on opposite sides of sensing beam 26', function as described above. In this embodiment of the transducer, terminals 37' for the strain gauges are mounted on a side of base 14' for modular connection to the resistance-measuring and readout devices employed with the transducer. It can be understood from the above description of the FIGS. 4-6 transducer embodiment that relocation of sensing beam 26' and its attendant transducer components to the bottom side of the transducer places them in a well-protected area. The overall function, service capabilities, and adjustment features of the transducer are substantially the same as those inherent with the first-described transducer embodiment of FIGS. 1-3.

I claim:

1. A transducer comprising
    a base,
    a load receiving member adapted to have a load imposed thereon,
    a sensing tip on said member,
    flexure means for mounting said member in substantial isolated and floating relationship on said base to permit independent flexing movements of said member relative to said base, said flexure means comprising a pair of leaf springs connected between said base and said member to form a parallelogram arrangement therewith and wherein said base has a reduced body portion and said member has a pair of extension overlying said body portion, each of said leaf springs being releasably interconnected between said base and a respective one of said extensions,
    sensing means, including a flat cantilever spring having a first end mounted in cantilevered relationship on said base and having a free second end positioned adjacent to said member for directly engaging said sensing tip in point contact to sense the load imposed on said member, for producing a variable electrical output signal in response to the magnitude of said load.

2. The transducer of claim 1 further comprising output adjustment means for selectively adjusting the point whereat said sensing tip engages said cantilever spring to selectively adjust said output signal.

3. The transducer of claim 2 wherein said output adjustment means comprises means adjustably mounted on said member for selectively adjusting the position of said sensing tip relative to a longitudinal axis of said cantilever spring.

4. The transducer of claim 3 wherein said output adjustment means further comprises a set screw threadably mounted in said member.

5. The transducer of claim 4 wherein said set screw has said sensing tip mounted on an end thereof and is threadably mounted on said member for adjustment in the direction of said longitudinal axis.

6. The transducer of claim 4 wherein said output adjustment means further comprises a plurality of threaded apertures formed in said member and wherein said set screw is threadably mounted in one of said apertures.

7. The transducer of claim 2 further comprising dead load adjustment means for selectively adjusting said sensing tip axially and perpendicular relative to said cantilever spring.

8. The transducer of claim 7 wherein said output adjustment means comprises a set screw and said dead load adjustment means comprises said set screw threadably mounted in said member for axial adjustment thereon.

9. The transducer of claim 1 further comprising overload adjustment means mounted on each of said extensions for delimiting movements of said member relative to said base.

10. The transducer of claim 1 wherein said sensing means further comprises strain gauge means secured on said cantilever spring for producing said variable electrical output signal in response to the magnitude of said load.

11. The transducer of claim 10 further comprising notch means formed in said cantilever spring adjacent to the first end thereof for inducing bending of said cantilever spring thereat, said strain gauge means secured on said cantilever spring adjacent to said notch means.

12. The transducer of claim 1 wherein said cantilever spring is mounted on an upper side of said base.

13. The transducer of claim 12 wherein said cantilever spring is mounted on a lower side of said base.

14. The transducer of claim 1 wherein the base of said transducer is secured in upstanding relationship on a stationary base and a weighing platter secured on said member.

15. A transducer comprising
a base,
an independent load receiving member,
a sensing tip on said member,
at least one thin spring connected between said base and said member to permit independent flexing movement of said member relative to said base,
a sensing beam having a first end attached in cantilevered relationship on said base and a free second end thereof positioned adjacent to said sensing tip to be deflected thereby in response to the imposition of a load on said member,
at least one strain gauge secured on said beam for producing a variable electrical signal in response to the magnitude of said load, and
output adjustment means for selectively adjusting a point whereat said sensing tip engages said sensing beam along its longitudinal axis whereby said output singal can be selectively adjusted, said output adjustment means comprising a set screw threadably mounted on said member.

16. The transducer of claim 15 wherein a pair of upper and lower leaf springs are connected between said base and said member to form a parallelogram arrangement therewith and wherein said sensing beam is positioned on an outer side of one of said springs.

17. The transducer of claim 16 wherein said sensing beam is attached to an upper side of said base and is positioned on an outer side of said upper leaf spring.

18. The transducer of claim 16 wherein said sensing beam is attached to lower side of said base and is positioned on an outer side of said lower leaf spring.

19. The transducer of claim 16 wherein said base has a reduced body portion and said member has a pair of extensions overlying said body portion, each of said leaf springs being releasably interconnected between said base and a respective one of said extensions.

20. The transducer of claim 19 further comprising overload adjustment means mounted on each of said extensions for delimiting movements of said member relative to said base.

21. The transducer of claim 15 wherein said sensing beam comprises a thin cantilever spring and further comprising notch means formed in said cantilever spring adjacent to the point whereat said cantilever spring is connected to said base for inducing bending of said cantilever spring thereat, said strain gauge secured on said cantilever spring adjacent to said notch means.

22. The transducer of claim 15 wherein said set screw has said sensing tip mounted thereon and is threadably mounted on said member for adjusting said sensing tip longitudinally relative to the longitudinal axis of said cantilever spring.

23. The transducer of claim 15 wherein said output adjustment means further comprises a plurality of threaded apertures formed in said member and wherein said set screw is threadably mounted in one of said apertures, said sensing tip formed on an end of said set screw.

24. The transducer of claim 15 further comprising dead load adjustment means for selectively adjusting said sensing tip axially and perpendicular relative to said sensing beam.

25. The transducer of claim 24 wherein said output adjustment means comprises a set screw and said dead load adjustment means comprises said set screw threadably mounted in said member for axial adjustment thereon.

26. A transducer comprising a base,
a load receiving member positioned adjacent to a lateral end of said base and adapted to have a load imposed thereon,
a pair of spaced and parallel flexure spring means connected between said base and said member for permitting independent flexing movements of said member relative to said base,
sensing beam means mounted in said transducer exteriorly of and adjacent to one of said flexure spring means for deflection in response to the imposition of a load on said load receiving member, and
at least one strain gauge secured on said sensing beam means for producing a variable output signal in response to the magnitude of said load.

27. The transducer of claim 26 wherein said sensing beam means comprises a flat spring connected to said base.

* * * * *